Figure 1:
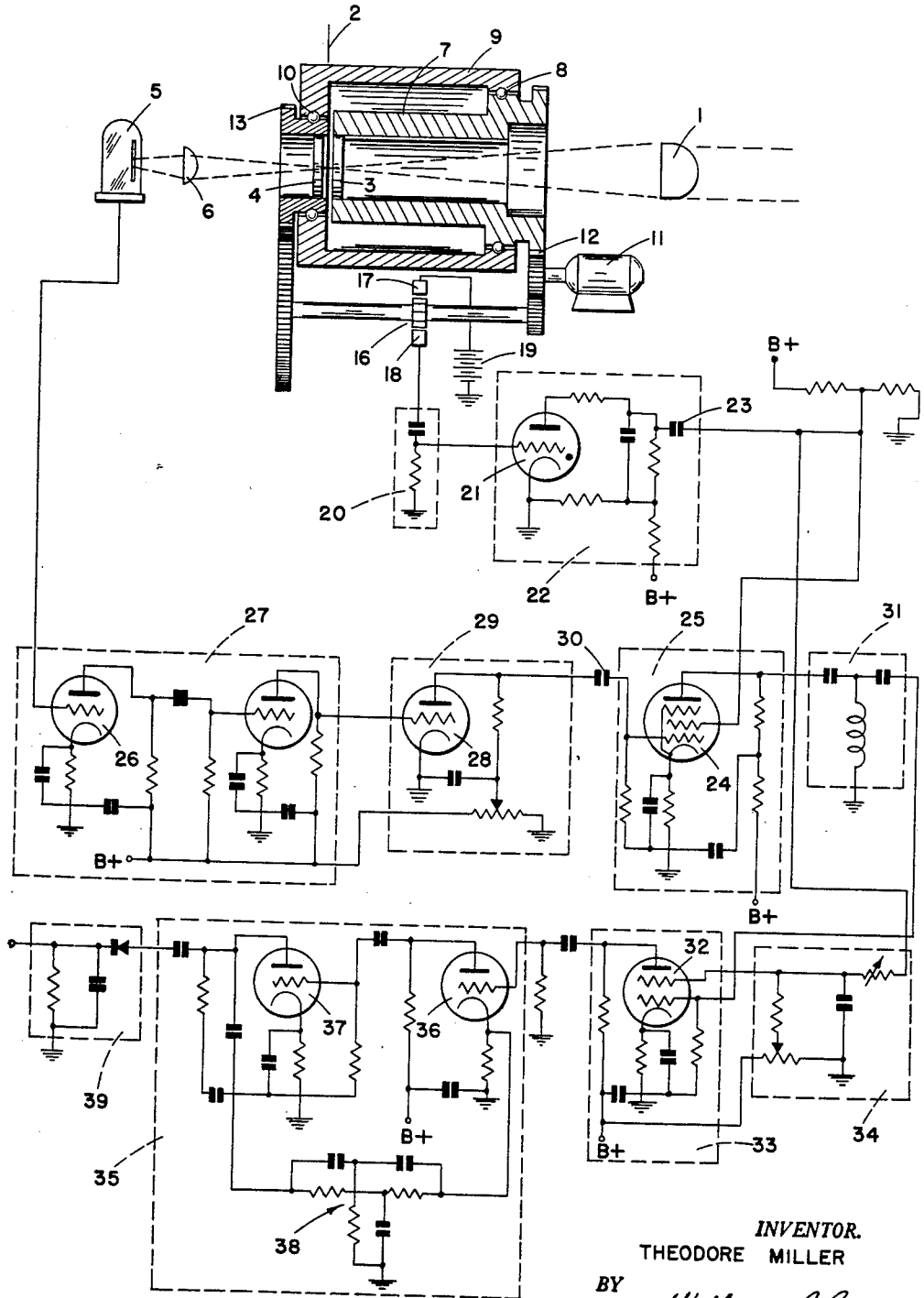

April 9, 1963 T. MILLER 3,085,158
ERROR MEASURING SYSTEM FOR SCANNERS
Filed Nov. 24, 1954 2 Sheets-Sheet 2

INVENTOR.
THEODORE MILLER
BY William R. Lane
ATTORNEY

United States Patent Office 3,085,158
Patented Apr. 9, 1963

3,085,158
ERROR MEASURING SYSTEM FOR SCANNERS
Theodore Miller, Los Angeles, Calif., assignor to
North American Aviation, Inc.
Filed Nov. 24, 1954, Ser. No. 470,953
12 Claims. (Cl. 250—203)

This invention relates to scanning devices and, particularly, to a system for measuring the magnitude of deviation of a radiant energy source with respect to the optical axis of the scanning device. Although the references herein to sources of radiant energy refer, ordinarily, to stars it is to be understood that the invention is equally applicable to infrared sources and similarly radiating bodies.

Scanning devices are utilized in radiant energy tracking devices in order to provide increased capability of detection of the sources against background radiation and, further, to provide a selective discrimination between sources. The tracking device is, in some instances, capable of tracking objects radiating either more or less than their background. In detecting those which radiate less, the sense of the drive relative to the error signals is reversed. Both schemes may be described as point by point sweep in search for objects having different radiation intensity than their backgrounds.

A tracking system which is responsive to radiant energy is provided with signals from the scanner indicating the magnitude of error of the radiant energy source with respect to the optical axis of the scanning device. This is variously termed "error," "radial error," or "magnitude of deviation" herein. It is obtained by providing information as to the sweep of the scanner apertures. That is, a signal is provided which varies according to the radial distance of the scanning aperture in each radial sweep. Using this signal as a reference, a signal can be generated indicating the radial error of a detected object.

In some instances, simplified scanner systems have merely utilized the direction of deviation in order to track, the correcting drive being made in the direction indicated, and maintained at a predetermined rate until no deviation is indicated. This invention proposes a system to supplement such simplified schemes with additional information as to magnitude of the error. The performance of a tracking servo drive system is greatly improved if the information it receives contains error magnitude information as well as direction information. The time response is bettered and the errors of overshoot are minimized.

Some scanners result in increased signal amplitude as the deviation error becomes less and less. This is due to the overlapping of successive aperture sweeps near the center of the scanner. As a consequence, and due to the variations in intensities of various sources, which also cause amplitude variations, signal amplitude is not used, ordinarily, to indicate magnitude of error. This invention, however, provides a novel method of providing a signal whose amplitude indicates radial error by increasing as the radial error increases.

It is therefore an object of this invention to provide a scanning system which indicates the magnitude of deviation of a detected object from the optical axis of the scanner.

It is another object of this invention to provide a scanning system which indicates by amplitude modulated signal the deviation error of a detected object.

It is a further object of this invention to provide a scanning system which compensates for increased signal strength due to the characteristics of certain scanners in which less deviation error causes increased signal intensity.

It is another object of this invention to provide a scanning system which corrects for the difference in intensities of various radiant energy sources.

Figure 2:
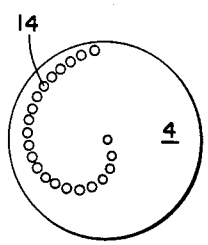
Figure 3:
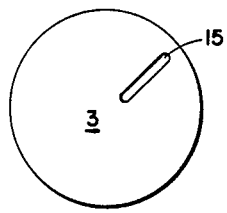
Figure 4:
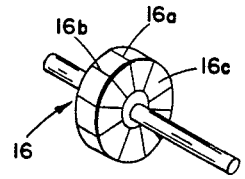
Figure 5:
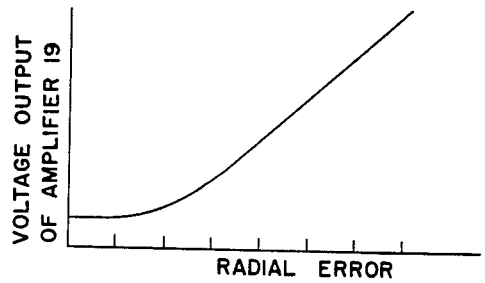
Figure 6:
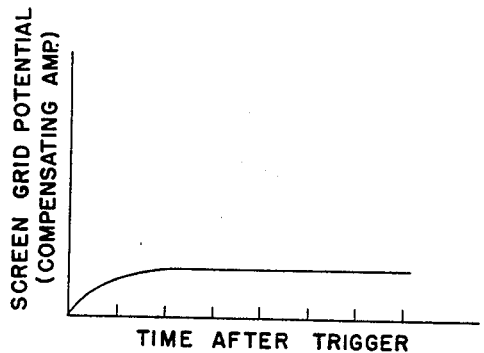

Other objects of invention will become apparent from the following description taken in connection with the accompanying drawings, in which FIG. 1 is a cross section of the scanner and schematic diagram of the electrical circuit;
FIG. 2 illustrates the apertures on one of the scanner discs;
FIG. 3 illustrates the slot on the other scanner disc;
FIG. 4 is a perspective of a commutator;
FIG. 5 illustrates the output of amplifier 19 as a function of radial error;
And FIG. 6 illustrates the screen potential applied to amplifier 23 as a function of time.

In the illustration of FIG. 1, a scan is obtained of a circular area by successive radial sweeps of an aperture. Objective lens 1 gathers light, or radiant energy, and focuses it upon focal plane 2. After passing discs 3 and 4, light is imaged upon the cathode of a photosensitive device such as phototube 5 by lens 6. Scanning is accomplished by a hollow shaft rotor 7 supported in bearings 8 within frame 9. Chopping disc 4 is also mounted within frame 9 by bearings 10. Motor 11 rotates gear 12 which is integral with hollow rotor 7, causing disc 3 (which has a radial slot therein) to rotate. Motor 11 also rotates ring gear 13 and disc 4, to which it is fixed, at a much higher speed than disc 3. Disc 4 contains several apertures, such as 14, arranged in the form of a spiral and causes a sweeping action of successive radial slot positions assumed by disc 3.

FIG. 2 illustrates the hole locations which form a spiral in disc 4, and FIG. 3 illustrates the radial slot 15 in disc 3.

Of a particular circular area scanned, the radial line scanned is fixed by slot 15 and the sweep along the radial line is determined by the holes of disc 4. The particular hole of disc 4 through which the field is viewed is termed "scanning aperture." It may be considered that disc 4 rotates counter clockwise and the scanning aperture commences at the center and sweeps outwardly.

In FIG. 1, a commutator 16 rotated by motor 11, together with brushes 17 and 18 and D.-C. source 19, provides a square wave pulse to differentiating R-C circuit 20 in synchronism with the time the holes of disc 4 commence to sweep slot 15. FIG. 4 illustrates the construction of commutator 16. Commonly-connected electrical conductors such as 16a and 16b are separated by insulating sections such as 16c. The differentiating circuit 20 provides a spike pulse, then, at the commencement of each radial sweep by the apertures. This spike signal is received at the grid of thyratron 21 of sweep generator 22. Sweep generator 22, then, provides a sweep voltage beginning at the commencement of each sweep and increasing linearly. The output of sweep generator 22 is connected through blocking condenser 23 to the screen grid of tube 24 of amplifier 25 to control its gain.

Phototube 5, receiving a scanning view of an area, provides electrical signals to the grid of tube 26 of two stage pre-amplifier 27. The amplified signal is received at the grid of tube 28 of limiter 29. The amplitude modulation due to various source intensities and spurious effects is removed by limiter 29 and the signals are received by limiter 29 and the signals are received through blocking condenser 30 at the control grid of tube 24 of variable gain amplifier 25. Since the gain of amplifier 25 is varied linearly by synchronized sweep generator 22, as each aperture commences a radial scan, the output signal of the amplifier is amplitude modulated according to how far out along radial slot 15 the image of the energy source is visible to phototube 5. Or, what is the same, an output signal is received which varies according to the deviation of an energy source from the optical axis of the scanner. Therefore, the output of amplifier 25 is amplitude modulated according to radial error. It can be seen that a reversed scan, in which the holes sweep successive radial lines from the periphery toward the center, the gain of the amplifier should be decreased linearly rather than increased. Inverting the output of the sweep generator and connecting it to the screen grid of amplifier 19 would provide the control of the gain. Although the gain of amplifier 25 is increased linearly, its output, as a function of radial error, will be that shown in FIG. 5. Overlapping sweeps in the scanner at small radial error cause the output of the amplifier 25 to be non-linear.

High-pass filter 31 receives the signal from amplifier 25 and attenuates the low frequencies produced by the scanning discs and passes the relatively high frequency pulses caused by detected radiant sources to the control grid of tube 32 of compensating amplifier 33. Due to the non-linear output of amplifier 25 versus radial error, as previously explained, amplifier 33 may be operated to compensate and produce a linear output voltage versus radial error. The gain of compensating amplifier 33 is, therefore, made non-linear with respect to time to compensate for the non-linearity of amplifier 25 shown in FIG. 5. FIG. 6 illustrates the non-linear screen voltage applied to amplifier 33 to make its gain non-linear. To obtain this non-linear screen voltage an integrating R-C network 34 receiving the voltage from the sweep generator 22 through blocking condenser 23 shapes the voltage and applies it to the screen grid of amplifier 33. The effects caused by overlapping sweeps are thus corrected. The time constant of R-C network 34 depends on the amount of overlap and is most easily determined by experimentation. It is apparent that a properly shaped screen potential (obtained by including a network such as 34 between generator 22 and the screen grid of tube 24) applied to amplifier 25 would eliminate the need for compensating amplifier 33 and R-C network 34. For explanatory purposes, however, these two component parts were included.

Band pass filter 35 receives the signal from compensating amplifier 33 and integrates it over a long period of time to build it up against the noise level of the system. This filter may be an integrating circuit or a high Q circuit, tuned to resonance at a subharmonic of the frequency of the periodic signal caused by an energy source in the scanning area. This circuit may also be a shock-excited oscillator (as shown), also known as a "ringing circuit." Tube 36 receives the signal from amplifier 33, amplifies it and passes it to the grid of tube 37. The twin "T" feedback filter 38 from tube 37 to tube 36 is tuned to positively feedback a frequency, for example, one-fifth of the periodic signal. Therefore, the fifth subharmonic receives positive feedback and other frequencies are rejected.

Demodulator 39 receives the output of band pass filter 35 from tube 37, changes it to D.-C. and provides the output signal. The output signal of demodulator 39 is a varying D.-C. voltage indicating by its magnitude the deviation (radial error) of a radiant energy source from the optical axis of the scanner.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a radial error measuring system, a scanner whose scanning aperture moves in successive radial sweeps, a radiant energy sensitive device, an amplifier connected to receive the output of said radiant energy sensitive device, means for varrying the gain of said amplifier, said means being responsive to the radial sweep of said scanner whereby the output of said amplifier by its amplitude indicates the radial error of an object whose radiation differs from its background.

2. In a scanning system, a scanner whose scanning aperture moves in successive radial sweeps, a radiant energy sensitive device, a limiter connected to receive the signal from said radiant energy sensitive device and remove the amplitude modulation therefrom, an amplifier connected to receive the output of said limiter, and means for controlling the gain of said amplifier, said means being responsive to the radial position of the scanning aperture of said scanner whereby the output of said amplifier indicates by its amplitude the radial error of a detected object whose radiation differs from its background.

3. In a scanning system, a scanner whose scanning aperture moves in successive radial sweeps, a radiant energy sensitive device, a limiter connected to receive the output of said radiant energy sensitive device and remove the amplitude modulation therefrom, an amplifier connected to receive the output of said limiter, means for non-linearly controlling the gain of said amplifier, said means being responsive to the radial position of the scanning aperture of said scanner whereby the output of said amplifier indicates by its amplitude the radial error of an object whose radiation differs from its background.

4. In a radial error measuring system, a scanner whose scanning aperture moves in successive radial sweeps, a radiant energy sensitive device, a limiter connected to receive the output of said radiant energy sensitive device and remove the amplitude modulation therefrom, an amplifier connected to receive the output of said limiter, means for producing a signal indicating the commencement of each radial sweep of the scanning aperture of said scanner, integrating means connected to receive said signal, said integrating means connected to control the gain of said amplifier whereby the output of said amplifier indicates by its amplitude the radial error of an object whose radiation differs from its background.

5. In a radial error measuring system, a radiant energy sensing device, a scanner therefor which scans in successive radial sweeps, a sweep generator connected to be triggered at the commencement of each radial sweep, an amplifier whose gain is responsive to the output of said sweep generator, said amplifier connected to receive the output of said sensing device.

6. In a radial error measuring system, a radiant energy sensitive device, a scanner therefor which scans in successive radial sweeps, a limiter connected to receive the output of said radiant energy sensitive device, a sweep generator connected to be triggered at the commencement of each radial sweep, an amplifier connected to receive the output of said limiter, means for controlling the gain of said amplifier, said means responsive to the output of said sweep generator.

7. In a radial error measuring system, a radiant energy sensitive device, a scanning device therefor which scans in successive radial sweeps, means for generating a pulse at the commencement of each radial sweep, a sweep generator triggered by said pulse generating means, a limiter connected to receive the output of said radiant energy sensing device and remove the amplitude modulation therefrom, an amplifier, means for controlling the gain of said amplifier, said means being responsive to the output of said sweep generator, said amplifier connected to receive the output of said limiter.

8. The combination recited in claim 7 wherein is included a filter connected to receive the output of said amplifier, said filter adapted to attenuate the lower scanning frequencies and pass the higher signal frequencies in the output of said amplifier.

9. The combination recited in claim 7 wherein is included a filter connected to receive the output of said amplifier and a compensating amplifier means for controlling the gain of said compensating amplifier in response to the output of said sweep generator and said compensating amplifier connected to receive the output of said filter.

10. The combination recited in claim 7 wherein is included a filter connected to receive the output of said amplifier and an integrating network connected to receive the output of said sweep generator, a compensating amplifier, means for controlling the gain of said compensating amplifier in response to the output of said integrating network, said compensating amplifier connected to receive the output of said filter.

11. The combination recited in claim 7 wherein is included a filter connected to receive the output of said amplifier, an integrating network connected to receive the output of said sweep generator, a compensating amplifier means for controlling the gain of said compensating amplifier in response to the output of said integrating network, said compensating amplifier connected to receive the output of said filter and a subharmonic band pass filter connected to receive the output of said compensating amplifier.

12. In a radial error measuring system comprising a radiant energy sensitive device and a scanning device which scans in successive radial sweeps, commutating means generating a pulse at the commencement of each radial sweep, a differentiating circuit connected to said commutating means to produce a spike at the leading edge of said pulse, a sweep generator connected to receive said spike and initiate a sawtooth wave in synchronism with said spike, limiting means connected to receive the output of said radiant energy sensitive device and remove the amplitude modulation therefrom, an amplifier connected to receive the output of said limiter and means for controlling the gain of said amplifier in response to the output of said sweep generator.

No references cited.